United States Patent [19]
Cardwell, Jr.

[11] 3,816,804
[45] June 11, 1974

[54] BILATERAL POWER CONDITIONER FOR SPACECRAFT

[75] Inventor: Gilbert I. Cardwell, Jr., Palos Verdes Peninsula, Calif.

[73] Assignee: Hughes Aircraft Company, Culver City, Calif.

[22] Filed: May 29, 1973

[21] Appl. No.: 365,296

[52] U.S. Cl. ................ 320/9, 307/66, 320/33, 320/43, 323/15, 323/20, 323/DIG. 1
[51] Int. Cl. ............................................. H02j 7/00
[58] Field of Search ............ 307/44, 48, 51, 52, 60, 307/64, 66; 320/4, 5, 9, 10, 11, 14, 20, 33, 39, 40, 43, 45, 50; 323/8, 15, 20, DIG. 1

[56] References Cited
UNITED STATES PATENTS

| | | | |
|---|---|---|---|
| 3,421,067 | 1/1969 | Wilson et al. | 320/14 |
| 3,489,915 | 1/1970 | Engelhardt | 307/66 |
| 3,696,286 | 10/1972 | Ule | 323/15 |

Primary Examiner—A. D. Pellinen
Attorney, Agent, or Firm—W. H. MacAllister; John Holtrichter, Jr.

[57] ABSTRACT

A system, especially useful in near earth orbiting spacecraft, that either allows the craft's solar panel to charge the vehicle's battery at a relatively high but controlled charge rate while supplying a minimum voltage to the satellite's bus-connected load, or that switches from the charge mode to a discharge mode so that the battery either shares the voltage supply function to the load or totally supplies at least a minimum bus voltage when the solar panel is in eclipse. The system includes separate charge and discharge power switches that are alternately operative in conjunction with a filter with switching periods determined by duty cycle modulator and depending for such alternate operation and switch periods on a control circuit which sense the bus voltage, the battery condition and the battery charge current.

12 Claims, 7 Drawing Figures

BILATERAL POWER CONDITIONER FOR SPACECRAFT

The invention herein described was made in the course of a contract or subcontract thereunder, with the Department of the Air Force.

BACKGROUND OF THE INVENTION:

The background of the invention will be set forth in two parts.

1. Field of the Invention

This invention relates generally to electrical power generating and conditioning systems for spacecraft and more particularly to systems for charging batteries from a solar panel arrangement and for discharging the battery into a bus-connected load when the power for the load is not being supplied by the solar panel arrangement.

2. Description of the Prior Art

In modern, high power satellite-type spacecraft, it is necessary to provide a self-contained source of electrical energy to power the various systems and subsystems in the craft. The source, in most instances, comprises a solar energy panel, a battery system, and a means for charging the battery subsystem when the solar panel is sufficiently illuminated and for discharging the battery subsystem to provide the required electrical power when the solar panel is not so illuminated.

Satellites are generally classified as operating in either far earth or synchronous orbits, or in near earth orbits. In the former, the operation allows a relatively long battery charge time with low charge values, safe continuous charge rates and with no criticality of termination. Thus, the battery charge control may be very simple, with either relay or transistor switching whereby a small number of solar cells are controllably coupled to the battery subsystem.

In contrast to the relatively simple problems and solutions found in far earth orbit operation, near earth orbiting satellites require a much more complex system to charge as well as discharge the craft's battery in an efficient switching mode rather than an inefficient dissipative mode. This is due to the necessity, in this type of operation, for rapid, high current charge and discharge cycles. In the past, the charge and discharge functions of satellites operating in near earth orbits have been performed by separate power conditioners with separate power inductors and separate power-filter capacitors, as well as separate duty cycle control modulators. It should therefore be obvious that a new "bilateral circuit" that includes common utilization of components and circuits to provide both battery charge and discharge functions and thereby minimize the parts count, bulk, complexity and weight would constitute a significant advancement of the art.

SUMMARY OF THE INVENTION:

In view of the foregoing factors and conditions characteristic of the prior art, it is a primary object of the present invention to provide an improved bilateral power conditioner for spacecraft.

Another object of the present invention is to provide a bilateral power conditioner that minimizes the parts count and complexity of a necessary system incorporated in a near earth orbiting spacecraft, which conditioner utilizes common components and circuits to provide both battery charge and discharge functions.

Still another object of the present invention is to provide a bilateral power conditioner for near earth orbiting spacecraft wherein the conditioner allows for rapid and efficient battery charge and discharge cycles at relatively high charge rates.

Yet another object of the present invention is to provide a bilateral power conditioner that includes means for sensing the spacecraft solar panel capability to charge the craft's battery and for controlling the charge current and/or voltage in accordance with the battery's state of charge, while maintaining a minimum bus voltage by causing the battery to discharge into the bus in a sharing mode with the solar panel during load transience and in a solo mode during solar panel eclipse periods.

In accordance with an embodiment of the present invention, there is provided a system for charging a battery from a solar panel arrangement connected to a bus, and for discharging the battery into a bus-connected load when the power for the load is not being supplied by the solar panel arrangement. The system includes filter means for filtering currents passing therethrough, and charge power switch means operatively coupled to the battery and to the filter means for allowing charging current originating at the solar panel arrangement to controllably pass therethrough and through the filter means to the battery, only when the system is in a charge mode of operation. The system also includes discharge power switch means operatively coupled to the battery and to the filter means for allowing battery discharge current to controllably pass therethrough and through the filter means to the bus, only when the system is in a discharge mode of operation. There is also provided duty cycle modulator means operatively coupled to the charge power switch means and to the discharge power switch means for controlling the duty cycle of operation of the charge power switch means and the discharge power switch means in response to modulator control feedback signals. The system further includes control means including a bus voltage sensor and a battery charge current sensor, the control means being operatively coupled to the duty cycle modulator means, to the charge power switch means and to the discharge power switch means for producing the modulator control feedback signals to control the duty cycle modulator means and for producing mode control gating signals actuating the charge mode of operation only when the bus voltage is above a predetermined value and actuating the discharge mode of operation only when the bus voltage is below the predetermined value.

The features of the present invention which are believed to be novel are set forth with particularity in the appended claims. The present invention, both as to its organization and manner of operation, together with further embodiments and advantages thereof, may best be understood by making reference to the following description, taken in conjunction with the accompanying drawing, in which like reference characters refer to like elements in the several views.

BRIEF DESCRIPTION OF THE DRAWINGS:

FIG. 5A is a graph relating battery charge-discharge with bus voltage for the power conditioner of FIG. 2, while

Figure 1:
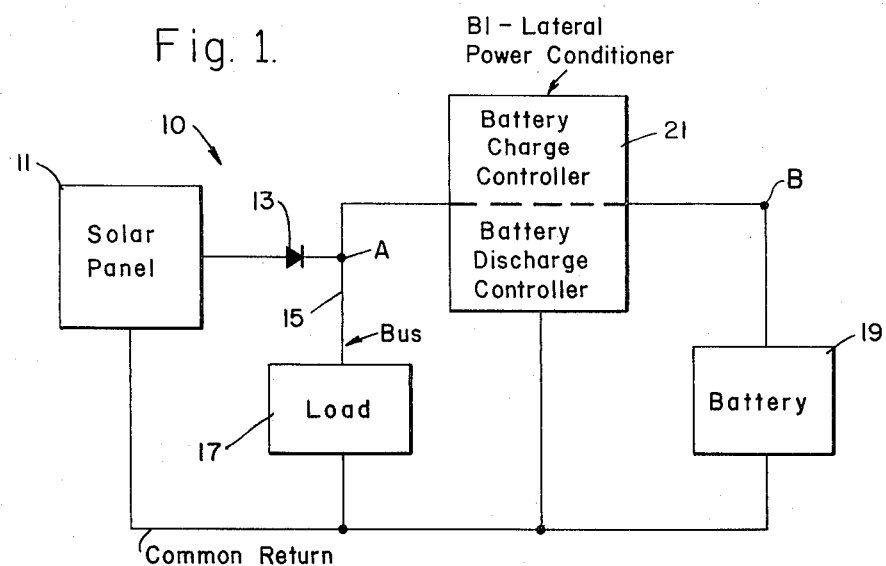
FIG. 1 is a block diagram of a spacecraft power system including a bilateral power conditioner in accordance with the present invention.

DESCRIPTION OF THE PREFERRED EMBODIMENT:

Referring now to the drawings and more particularly to FIG. 1, there is shown a block diagram of a spacecraft power system 10 including a solar panel arrangement 11 connected through a conventional solar panel diode arrangement 13 to a bus 15, a spacecraft load 17 also connected to the bus 15, a rechargeable battery 19, and a bilateral power conditioner 21 connected between the bus 15 at point A and the battery 19 at point B.

Figure 2:
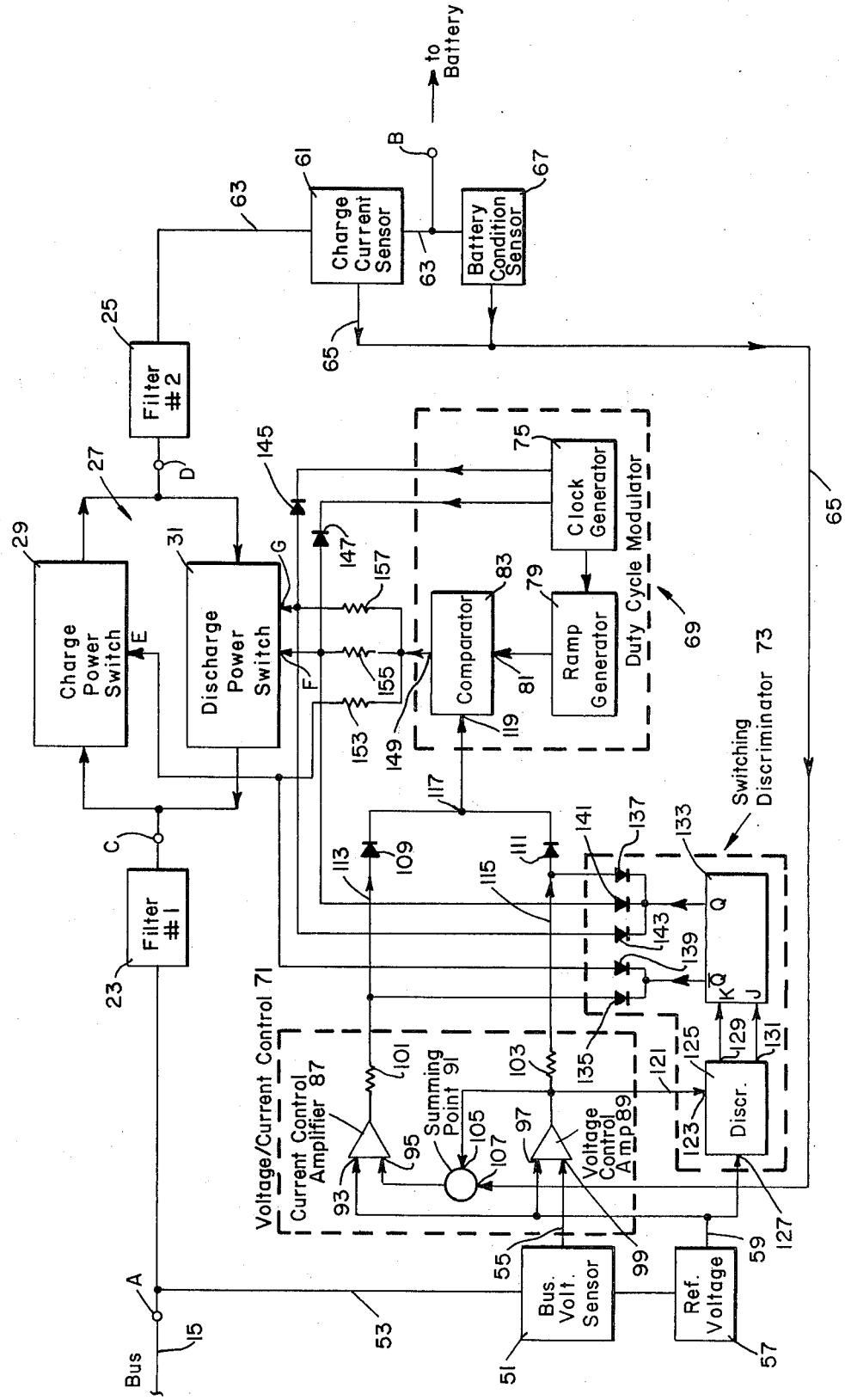
FIG. 2 is a functional block diagram of the bilateral power conditioner of FIG. 1.

The bilateral power conditioner 21 is illustrated in more detail in FIG. 2 and includes a first conventional power filter 23 connected between points A and C, a second conventional power filter 25 connected between points B and D, and power switch means 27 connected between points C and D and including a charge power switch 29 connected in parallel with a discharge power switch 31. Typically the power filters include series connected inductors and shunt capacitors of relatively high capacitance, between 1,000 and 10,000 microfarads for example.

Figure 3:
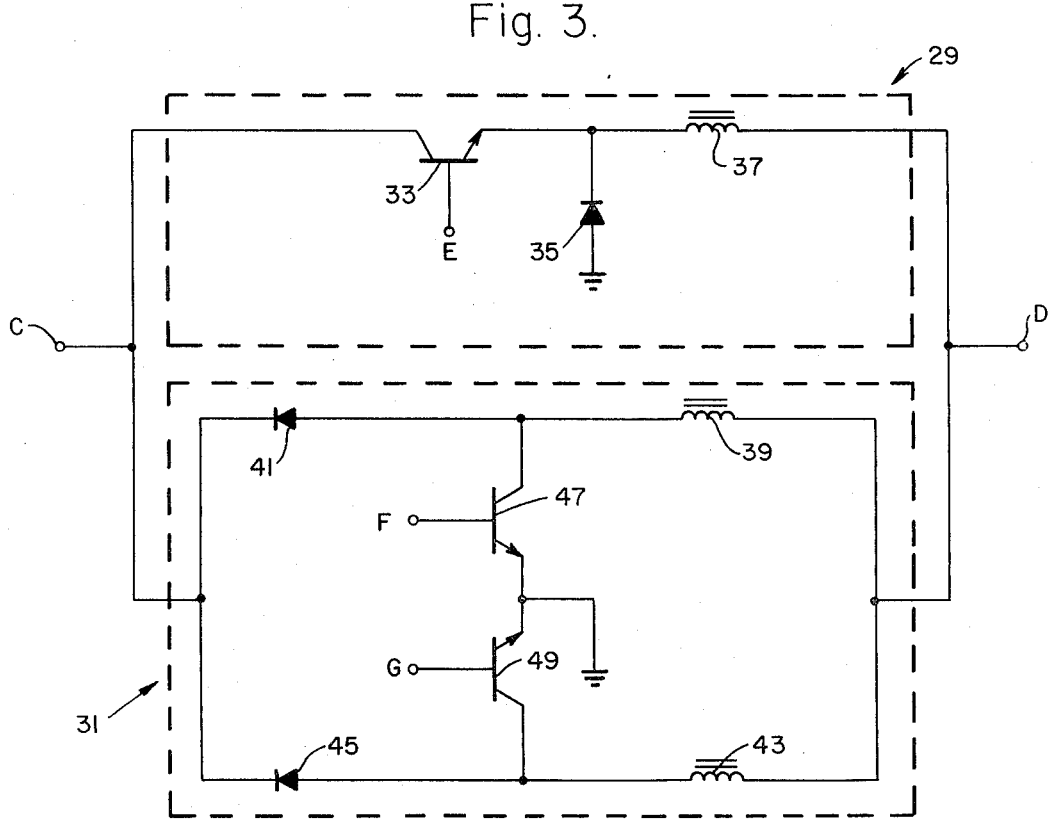
FIG. 3 is a simplified schematic diagram of the battery charge and discharge power switches of FIG. 2.

The simplified schematic diagram of FIG. 3 shows the charge power switch 29 basically includes a transistor 33 shunted to ground by a suitably polarized diode 35 and connected in series with a smoothing inductor 37 which functions in conjunction with the filters 23 and 25 for proper filter action. The charge power switch circuit is a switching regulator of the current controlled chopper type and allows the battery to be charged at a desired rate depending upon the reoccurrence rate and duration of gating signals delivered to the transistor control input terminal, herein identified at point E at the base electrode of transistor 33.

In the parallel connected discharge circuit 31, there is provided a first current path consisting of an inductor 39 and a diode 41, and a parallel second current path consisting of inductor 43 and diode 45. Between the respective inductors and diodes there are disposed transistor switches 47 and 49, both having emitters shunted to ground and having respective control electrodes (in this case their base electrode) F and G coupled to appropriate alternating actuating gating signals, as will be described hereinafter in more detail. This circuit functions as an energy storage boost-add power conditioner to boost battery voltage to a desired regulated bus voltage. Although in the preferred embodiment the battery voltage is below the bus voltage and must be boosted to the bus voltage, it should be understood that in other embodiments, the battery voltage could be greater than the bus voltage where a boost on charge circuit would be utilized.

Referring again to FIG. 2, it can be seen that the bilateral power conditioner 21 further includes a bus voltage sensor 51 having an input lead 53 connected to the bus 15 and providing at its output lead 55 a DC bus voltage signal indicative of the voltage at the bus 15. There is also shown a conventional reference voltage source 57 providing at its output lead 59 a DC reference voltage signal that is essentially constant in magnitude at a fixed relationship to a selected bus voltage magnitude. A charge current sensor 61 is connected in a line 63 between the second power filter 25 and the battery 19 to provide at its output lead 65 a DC charge current signal indicating the magnitude of the current flowing in the line 63, and preferably a battery condition sensor 67 is coupled to the battery 19 and to the lead 65 to modify the charge current signal in a manner indicative of the charge condition of the battery 19, as will be described in more detail hereinafter.

Figure 4:
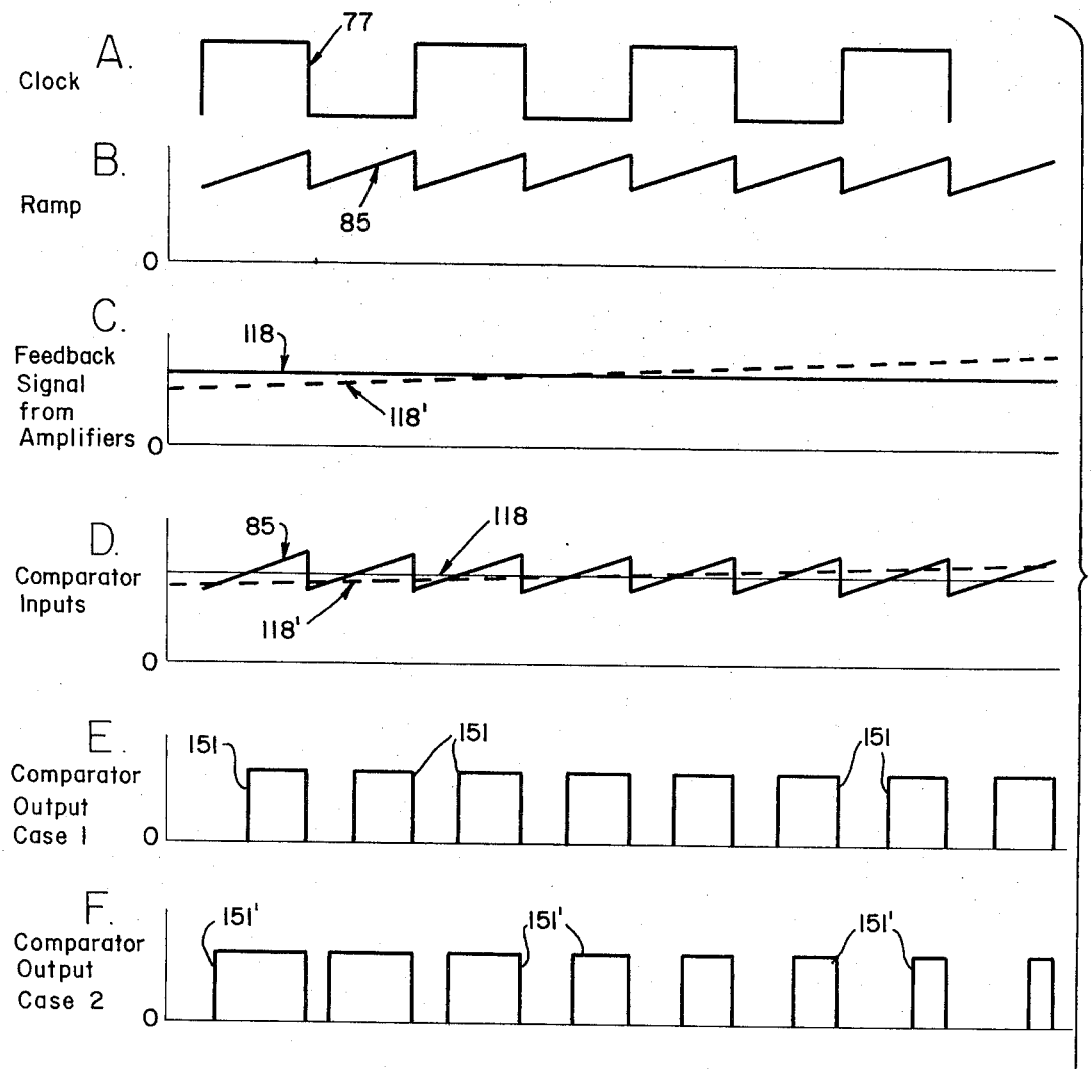
FIG. 4 is a graphical representation of various clock, feedback and control signals generated in the bilateral power conditioner of FIG. 2.

The power conditioner 21 further includes a duty cycle modulator 69, a voltage/current control circuit 71 and a switching discriminator 73. The duty cycle modulator 69 basically includes a conventional clock generator 75 generating a square wave clock signal 77 that is coupled to a wave-shaping ramp generator 79 which provides to a first input 81 of a comparator 83 a ramp signal 85 of essentially constant magnitude and of a duration governed by the clock signal 77, as illustrated in FIG. 4.

The voltage/current control 71 basically includes a current control amplifier 87, a voltage control amplifier 89 and a summing arrangement 91. A first input 93 of the amplifier 87 receives the reference voltage signal from the lead 59 while the amplifier 87 simultaneously receives a composite feedback signal from the summing arrangement 91 at its second input 95. As also can be seen in FIG. 2, a first input 97 of the voltage control amplifier 89 also receives the reference voltage signal from the lead 59 while simultaneously receiving at its second input 99 the bus voltage signal provided at the lead 55.

The control amplifiers 87 and 89 are provided with suitable output load impedances 101 and 103, respectively, and a portion of a DC voltage control feedback signal produced by the voltage control amplifier 89 is coupled to a first input 105 of the summing arrangement 91, the charge current signal being coupled to its second input 107 via lead 65 to produce the aforementioned composite feedback signal. In order to prevent interaction between the current and voltage control amplifiers 87 and 89, isolation diodes 109 and 111 are disposed in the output leads 113 and 115, respectively, and pulled to prevent the control feedback signal generated by the opposite amplifier from passing therethrough. However these diodes allow the respective control feedback signals to reach a junction 117 and one or the other to become a modulator control feedback signal 118 that is coupled to a second input 119 of the comparator 83 of the duty cycle modulator 69.

Another sample of the voltage control feedback signal generated by the voltage control amplifier 89 is coupled by lead 121 to a control input 123 of a discriminator circuit 125 which may be a high-gain, open loop, amplifier or Schmidt trigger with very little hysteresis. The function of the discriminator circuit 125 is to compare the voltage control feedback signal with the reference voltage signal coupled to its reference input 127 and to produce flip-flop control signals at its two output terminals 129 and 131. The flip-flop control signals are coupled to respective K and J input terminals of a conventional J-K flip-flop circuit 133 or equivalent, which, in turn, produces bilevel mode control gating signals at its $\bar{Q}$ and Q output terminals.

The $\bar{Q}$ output terminal of the flip-flop circuit 133 is coupled through an appropriately polarized first diode 135 to the output lead 113 of the current control amplifier 87 to effectively short out the circuit control gating signal thereat when the mode control gating signal at the $\bar{Q}$ terminal is at its lower level. Similarly, a suitably polarized diode 137 is connected between the Q terminal of the flip-flop circuit 133 and the output lead 115 of the voltage control amplifier 89 to effectively prevent the voltage control feedback signal from reaching the junction 117 when the mode control gating signal at the Q terminal is in its lower state. Of course, it should be clear that because of the nature of the flip-flop circuit 133, whenever the signal at one of the output terminals is low, the signal at the other terminal is at its higher level.

The bi-level mode control gating signals are also coupled to the power switch means 27 in order to control the mode of operation of the power system 10. It can be seen in FIGS. 2 and 3 that the signal at $\bar{Q}$ is coupled to the point E of the charge power switch 29 through a diode 139, while diodes 141 and 143 provide a mode control gating signal path to the two gating input points F and G, respectively, of the discharge power switch 31. Also connected to the points F and G are diodes 145 and 147 that couple clock pulses 77 from the clock generator 75 to the inputs of the discharge power switch 31 in order to alternately allow activation of the two switching transistors 47 and 49.

As to the function of the duty cycle modulator 69, it has been disclosed that the clock generator 75 sets the basic running frequency of the bilateral system 10. The ramp generator 79 produces the clocked ramp wave form 85 which is delivered to the comparator or conventional level detector 83 for comparison thereat with the modulator control feedback signal 118 to produce at its output terminal 149 a pulse width modulated or duty cycle signal 151 that drives either the charge power switch 29 or the discharge power switch 31 through appropriate isolation impedances 153, 155 and 157.

FIG. 4 illustrates various signal relationships in the operation of the duty cycle modulator 69. At all times the clock and ramp signals (FIG. 4A and FIG. 4B, respectively) remain at essentially a constant amplitude and duration, while the modulator control feedback signal 118 may be constant or may vary in accordance with changes recognized by the several sensors in the system 10. In a first case, we may assume that the system is stable, which condition produces a constant modulator control feedback signal 118, as viewed in FIG. 4C as a solid line. This constant amplitude signal is compared in the level detector 83, as shown by the superimposed signal wave forms in FIG. 4D. It will be noted that the wave form 118 intercepts a like portion of the successive cycles of the ramp signal 85. The level detector 83 then compares the difference in magnitude of these two input signals and produces a pulsed wave form signal 151 that is of constant magnitude but which is related in width directly with the time the magnitude of the ramp signal 85 exceeds the magnitude of the modulator control feedback signal 118. Thus, where the feedback signal does not vary in magnitude, the width of all of the pulses making up the comparator output signal 151 are equal, as shown as case I in FIG. 4E.

However, changes in the solar panel illumination and battery charge condition, for example, always occur and these changes will be reflected by a change in the modulator control feedback signal 118, as will be described in more detail later. To illustrate the effect of such a change, FIG. 4C indicates a sloping wave form 118' (dashed line) for the dc modulator control feedback signal. In this example, the magnitude of the signal 118' is constantly rising so that the portion of the ramp signal 85 above the signal 118' becomes progressively less. Accordingly, the width (which governs the duty cycle of operation of the power switching means 27) of successive ones of the pulses making up the comparator output signal 151' for case II, becomes progressively less as shown in FIG. 4F. In all cases, however, the repetition rate remains locked to that of the clock pulse 77.

Referring now to the function of the voltage/current control circuit 71, it should be understood at the outset that the current and voltage control amplifiers 87, 89 are each essentially a closed loop negative feedback amplifier system. The characteristic of such a system is to cause its output to change in a direction and magnitude that tends to force the magnitude of its two input signals to be equal. Thus, for example, where the bus voltage signal at the terminal 99 of the voltage control amplifier 89 is less in magnitude than that of the constant reference voltage signal at its other input terminal 97, the voltage control feedback signal produced by the amplifier 89 will change in a direction to raise the bus voltage. Such a condition would occur, for example, where the illumination of the solar panel 11 was reduced to a point where the bus voltage, as supplied by the panel arrangement, drops below a predetermined minimum value. It also will occur when the load 17 is increased and the solar panel assembly 11 can no longer support this additional load without aid from the battery 19 by activating the battery discharge mode of operation for the system 10.

Looking into the operation of the voltage and current control amplifiers 87 and 89, it should be clear that they provide output signals proportional to the respective sensed bus voltage (by the sensor 51) and the sensed charged current of the battery 19 (through the sensor 61). Because these two output signals cannot be utilized by the duty cycle modulator 69 at the same time, the particular one of these signals which is to be sent to the modulator 69 must be determined by selection type circuitry based on information sensed in the system. Accordingly, this selection is provided by the switching discriminator 73, as will subsequently be described.

As noted previously, part of the voltage control feedback signal from the output of the voltage control amplifier 89 is directed to input 105 of the summing circuit 91 where it is in effect compared with the charge current signal at the other input 107 of the circuit 91 to provide a composite signal to the input 95 of the current control amplifier 87. In this way, the current control amplifier 87 is provided with an input that is related to both the potential at the bus 15, the charge current to the battery 19, and to the charge condition of the battery 19. Accordingly, the characteristic of the amplifier 87 is to change its output signal in a direction and magnitude that will tend to change the level of the signal at its input terminal 95 to match that of the reference voltage source found at its other input terminal 93.

As will be described, the output signal from the current control amplifier will only be coupled to the duty cycle modulator 69 to control the duty cycle of operation of the charge power switch 29 only when the system 10 is in its battery charge mode of operation. Thus, the level of the bus voltage at, above or below a desired potential level, and the state of the charge and the charge current being fed to the battery 19 control the duration of each "on" cycle of the charge power switch 29 through the operation of the current control amplifier 87 and the duty cycle modulator 69. For example, if the battery 19 is sensed by the battery condition sensor 67 to be fully charged, or if the potential at the bus 15 is sensed by the bus voltage sensor 51 to be at or below a predetermined level, or both, the composite signal provided by the summing circuit 91 to the current control amplifier 87 will be low as compared to the reference voltage signal at its other input terminal, and the current control feedback signal will increase and be coupled to the comparator 83 as an increasing modulator control signal 118' (assuming that the system is in its charge mode of operation). As shown in FIG. 4D, this increased level of modulator control input signal causes the duty cycle of the pulse width modulated output signal 151 of the duty cycle modulator to decrease and may even cause it to be effectively eliminated so that no charge current is fed to the battery 19.

Where the decrease in the composite signal fed to the current control modulator is due to a decrease in the bus potential (from any cause), the voltage control feedback signal produced by the voltage control amplifier 89 will have decreased. This decrease is compared in the discriminator circuit 125 with the reference voltage signal, and if greater than a predetermined amount, the discriminator will produce its flip-flop control signals which set the state of the flip-flop circuit 133 to its discharge mode condition. In such a condition, the $\bar{Q}$ output of the flip-flop circuit 133 is "0", or low, while the Q output is "1" or high. As noted previously, where $\bar{Q}$ is low, the diode 135 effectively shorts out the current control feedback signal and only the voltage control feedback signal can reach, and thereby influence, the operation of the duty cycle modulator 69. Also, the $\bar{Q}$ low condition effectively prevents the pulse width or duty cycle modulated signal 151 from reaching the charge power switch 29 that could activate it. In this manner, the bus voltage is controlled by an active feedback loop during battery discharge.

On the other hand, where the bus voltage is higher than a predetermined level, from whatever cause, the voltage control feedback signal will be higher than a predetermined level of comparison with the reference voltage signal, causing the discriminator 125 to set the flip-flop 133 with its Q output low. Here, the voltage control feedback signal will be prevented from reaching the junction 117 and only the current control feedback signal will affect the duty cycle modulator 69. Also, this condition of the flip-flop 133 effectively prevents the duty cycle signal 151 from reaching the discharge power switch 31, and only the charge power switch 29 is allowed to function.

It will be noted that the output state of the switching discriminator 73 is determined by the output of the voltage control amplifier 89. Thus, the switching discriminator 73 is controlled by the bus voltage and not by the charge current or the state of charge of the battery 19. Therefore, any time the bus voltage, as sensed by the bus voltage sensor 51, is above a minimum value the battery 19 is allowed to charge if it is required, as sensed by the battery condition sensor 67. If the battery 19 is charging and the bus voltage approaches the minimum value (before the discriminator commands the system to switch to the discharge mode of operation) the voltage control amplifier 89 will command a linear decrease in charge current in an attempt to prevent the bus voltage from dropping to the minimum design value.

It is to be pointed out that the operation noted immediately above is controlled by a single voltage sensor and a single voltage reference within the bilateral system 10, and drifts caused by aging in the voltage sensor or voltage reference source cannot cause the bilateral system to limit cycle oscillate between charge and discharge modes of operation. It is also impossible to force the bilateral system 10 into a simultaneous charge and discharge operation.

It should also be clear that if the bilateral system 10 is in its charge mode of operation and the bus voltage is sufficient such that the voltage control amplifier 89 is not controlling the charge current, the charge current sensor becomes the feedback source and the battery 19 is charged at a constant, controlled current. Although reference has been made herein to a battery 19, it should be understood that a combination of batteries may be charged and discharged in the manner described.

Figure 6:
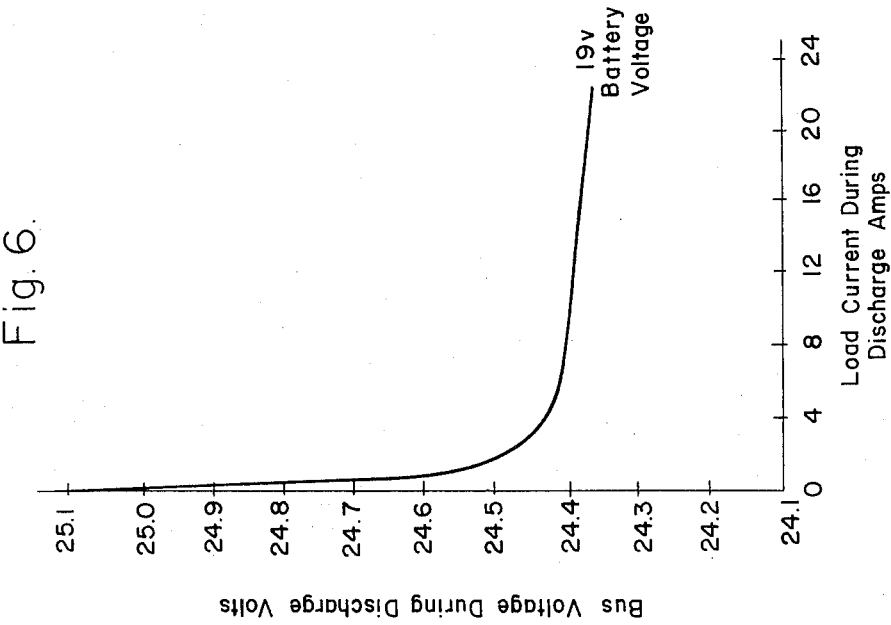
FIG. 6 is a graphical representation illustrating the relationship in a typical conditioner of FIGS. 1 and 2, between bus voltage and load current, during discharge.
Figure 5A:
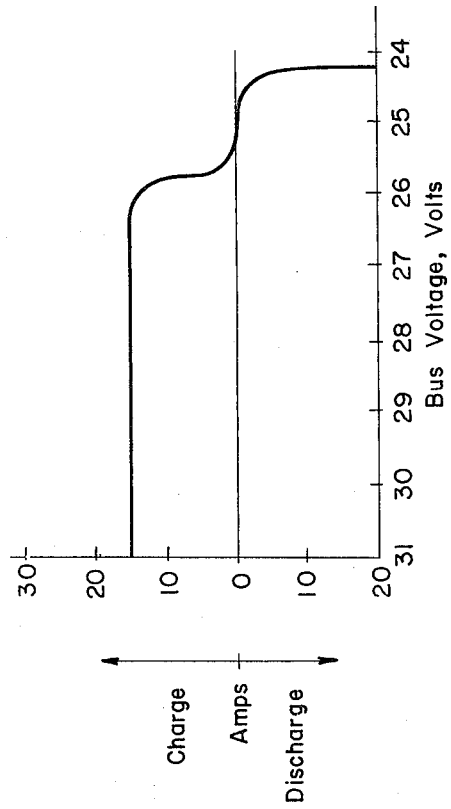
Figure 5B:
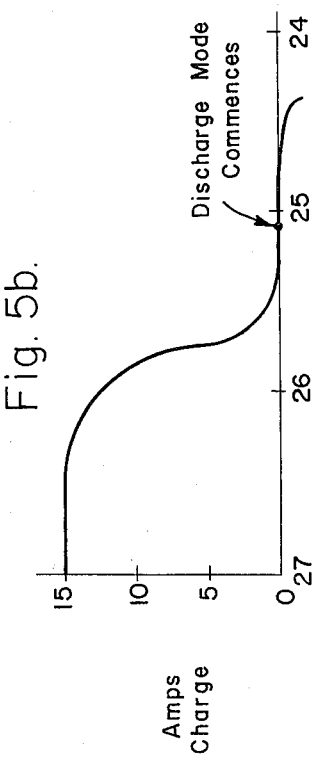
FIG. 5B is an enlarged view of a portion of the graph of FIG. 5A.

FIGS. 5A, 5B and 6 represent a typical response of a bilateral power conditioner system 10 in one embodiment of the invention. In the above-mentioned FIGURES the minimum desired bus voltage is approximately 24 volts. At any bus voltage above approximately 26.25 volts the battery 19 may be charged at a controlled current of approximately 15 amps.

FIG. 5B is an expansion of FIG. 5A, and FIG. 6 is a further expansion of FIG. 5B showing bus voltage vs bilateral system load current while operating in the discharge mode. It can be seen in FIG. 5B that as the bus voltage falls below approximately 26.25 volts the battery charging current is reduced and is zero at approximately 25.25 volts. At approximately 25.1 volts the discharge mode commences and as the bus voltage attempts to fall further the battery is discharged in a manner to support the bus above a minimum or 24 volts as shown in FIG. 6.

The summing circuit or point 91 may, for example, consist of a terminating resistor driven by current signal sources through appropriately polarized diodes, as is well known in the art. As to the battery condition sensor, this circuit may be in the form of a coulombmeter or amp/hour counter, or a precision, temperature compensated voltage sensing device. Whatever particular circuit is used, it must in the system 10 be a current source that increases its output as the battery approaches full charge.

It should be evident from the foregoing that the present invention provides a new and improved bilateral power conditioner for spacecraft that either allows the craft's solar panel to charge the vehicle's battery at a relatively high but controlled charge rate while supplying a minimum voltage to the satellite bus-connected load, or that switches from the charge mode to a discharge mode so that the battery either shares the voltage supply function to the load or totally supplies at least a minimum bus voltage when the solar panel is in eclipse.

Although the present invention has been described with reference to particular embodiments, various changes and modifications obvious to one skilled in the art to which the invention pertains are deemed to be within the spirit, scope and contemplation of the invention.

What is claimed is:

1. In a system for charging a battery from a solar panel arrangement connected to a bus, and for discharging the battery into a bus-connected load when the power for the load is not being supplied by the solar panel arrangement, the improvement comprising:
   filter means for filtering currents passing therethrough in opposite first and second directions;
   charge power switch means operatively coupled to said battery and to said filter means for allowing charging current originating at said solar panel arrangement to controllably pass therethrough and through said filter means in said first direction to said battery only when said system is in a charge mode of operation;
   discharge power switch means operatively coupled to said battery and to said filter means for allowing battery discharge current to controllably pass therethrough and through said filter means in said second direction to said bus only when said system is in a discharge mode of operation;
   duty cycle modulator means operatively coupled to said charge power switch means and to said discharge power switch means for controlling the duty cycle of operation of said charge power switch means and said discharge power switch means in response to modulator control feedback signals; and
   control means including a bus voltage sensor and a battery charge current sensor and operatively coupled to said duty cycle modulator means, to said charge power switch means and to said discharge power switch means for producing said modulator control feedback signals to control said duty cycle modulator means and for producing mode control gating signals actuating said charge mode of operation only when the bus voltage is above a predetermined value and actuating said discharge mode of operation only when said bus voltage is below said predetermined value.

2. In the system according to claim 1, wherein said bus voltage sensor provides a bus voltage signal and said battery current sensor provides a charge current signal, wherein said control means also includes a reference voltage source providing a reference voltage signal, and wherein said control means further includes voltage/current control means having voltage control amplifier means comparing at its input said bus voltage signal with said reference voltage signal to produce as part of said modulator control feedback signals a d.c. voltage control feedback signal, and also having summing circuit means comparing at its input said voltage control feedback signal with said charge current signal to produce a composite feed-back signal, and further having current control amplifier means comparing at its input said reference voltage signal with said composite feedback signal to produce also as part of said modulator control feedback signals a d.c. current control feedback signal.

3. In the system according to claim 2, wherein said voltage control amplifier means and said current control amplifier means include respective voltage control and current control output circuitry wherein said voltage and current control feedback signals are joined at a junction but including isolation means for isolating said feedback signals from each other, said feedback signals being coupled to said duty cycle modulator means from said junction.

4. In the system according to claim 3, wherein said control means still further includes switching discriminator means comparing at its input said voltage control feedback signal with said reference voltage signal to produce said mode control gating signals, said mode control gating signals actuating said modes of operation in accordance with the magnitude of said voltage control feedback signal relative to said reference voltage signal.

5. In the system according to claim 4, wherein said switching discriminator means is operatively coupled to the outputs of said voltage control amplifier means and said current control amplifier means for allowing only said voltage control feedback signal to reach said duty cycle modulator means when said mode control gating signals actuate said discharge mode of operation and for allowing only said current control feedback signal to reach said duty cycle modulator means when said mode control gating signals actuate said charge mode of operation.

6. In the system according to claim 4, wherein said switching discriminator means includes a discriminator circuit responsive to said voltage control feedback signal and to said reference voltage signal to produce flip-flop control signals, and also includes a flip-flop type circuit with inputs coupled to said discriminator circuit and responsive to said flip-flop control signals, said flip-flop circuit producing at first and second output terminals said mode control gating signals in bi-level form, the level at said first of said output terminals relative to the opposite level at said second of said output terminals determining the mode of operation of said system.

7. In a system according to claim 6, wherein said switching discriminator includes an appropriately polarized diode arrangement coupled between said first of said output terminals and said voltage control output circuitry and between said second of said output terminals and said current control output circuitry to prevent said voltage control feedback signal from being coupled to said duty cycle modulator means only when the level of said mode control gating signal at said first output terminal is in a low state and to prevent said current control feedback signal from being coupled to said duty cycle modulator means only when the level of said mode control gating signal at said second output terminal is in a low state.

8. In the system according to claim 1, wherein said duty cycle modulator means includes a clock generator producing a clock signal, a ramp generator coupled to said clock generator and responsive to said clock signal to generate a clocked ramp signal, and a comparator circuit coupled to said ramp generator and to said control means and respectively responsive to said clocked ramp signal and to said modulator control feedback signal, said comparator circuit producing at its output terminal a duty cycle signal selectively coupled to said charge power switch means and said discharge power switch means in response to said mode control gating signals coupled to said respective switch means.

9. In the system according to claim 1, wherein said charge power switch means includes a current controlled chopper type switching regulator.

10. In the system according to claim 9, wherein said switching regulator includes an emitter-collector series connected transistor connected in series with a smoothing inductor and shunted to ground therebetween by an appropriately polarized diode, said duty cycle modulator means being operatively coupled to the base electrode of said transistor.

11. In the system according to claim 8, wherein said discharge power switch means includes an energy storage boost-add power conditioner means for boosting battery voltage to a regulated bus voltage.

12. In the system according to claim 1, wherein said control means also comprises battery condition sensor means having an input coupled to said battery and responsive to the voltage of said battery and having an output coupled to the output of said battery charge current sensor for causing said control means to linearly change said charging current inversely as the battery voltage approaches a predetermined fully charged level.

* * * * *